ered to a temperature of about $100^\circ$ to $160^\circ$ F. (preferably about $120^\circ$ F.), conducting the treated oil from the second

United States Patent [19]

Garrett, Jr.

[11] Patent Number: 4,498,992
[45] Date of Patent: Feb. 12, 1985

[54] PROCESS FOR TREATING CONTAMINATED TRANSFORMER OIL

[75] Inventor: Luther W. Garrett, Jr., San Mateo, Calif.

[73] Assignee: Petro-Williams Service Company, Tulsa, Okla.

[21] Appl. No.: 578,427

[22] Filed: Feb. 9, 1984

[51] Int. Cl.$^3$ .............................................. B01D 15/00
[52] U.S. Cl. ..................... 210/664; 208/182; 208/184; 210/663; 210/669; 210/774; 210/806
[58] Field of Search ............. 208/179, 182, 184, 187; 210/663, 664, 669, 774, 806

[56] References Cited

U.S. PATENT DOCUMENTS

| | | | |
|---|---|---|---|
| 3,339,346 | 9/1967 | Buchanan | 55/356 |
| 3,675,395 | 7/1972 | Baranowski | 55/164 |
| 4,144,162 | 3/1979 | Edgar et al. | 210/909 |
| 4,340,471 | 7/1982 | Jordan | 210/909 |
| 4,353,798 | 10/1982 | Foss | 210/181 |
| 4,379,752 | 4/1983 | Norman | 210/909 |
| 4,416,767 | 11/1983 | Jordan | 210/909 |

OTHER PUBLICATIONS

Ansi/IEEE C57.106-1977.
Schenck, Robert, "Transformer Oil Conditioning Saves Time and Money", Transmission and Distribution, Jan. 1983, pp. 40-41.
Pennwalt Corporation Bulletin 950 (981-SM-1P).
Pennwalt Corporation Data Sheet 910D (583-5M-1P).

*Primary Examiner*—Ivars Cintins
*Attorney, Agent, or Firm*—William S. Dorman

[57] ABSTRACT

A process for treating contaminated transformer oil which comprises heating the contaminated transformer oil in a first heater to a temperature in the range of $100^\circ$ to $125^\circ$ F., passing the heated contaminated oil from the first heater through an adsorber containing Fuller's earth of about 30 to 60 mesh particle size, conducting the treated oil from the adsorber to a chiller where the temperature is reduced to about $50^\circ$ to $70^\circ$ F., conducting the treated oil from the chiller to a centrifuge to remove free water, conducting the treated oil from the centrifuge to a second heater where the oil is heated to a temperature of about $100^\circ$ to $160^\circ$ F. (preferably about $120^\circ$ F.), conducting the treated oil from the second heater to a degasifier wherein the oil is subjected to a vacuum of about 0.2 to 2 mm of mercury, removing the treated oil from the degasifier and passing it through a polishing filter.

9 Claims, 3 Drawing Figures

WATER (ppm) AT SATURATION IN IO-C OIL
VS. TEMPERATURE (°F) OF THE OIL

PROCESS FOR TREATING CONTAMINATED TRANSFORMER OIL

BACKGROUND OF THE INVENTION

1. Field of the Invention

This invention relates to an improved method of reconditioning and reclaiming transformer insulating oil. For the purposes of this application, reconditioning means the removal of moisture and solid materials by mechanical means and the removal of moisture and gas by subjecting the oil to high levels of vacuum. Reclaiming is the removal of acidic compounds and other products of oxidation and colloidal contaminants by treatment with an adsorbent.

2. The Prior Art

Both reconditioning and reclaiming of transformer oil are practiced in the art. As described in the Institute of Electrical and Electronic Engineers Guide for Acceptance and Maintenance of Insulating Oil in Equipment (ANSI/IEEE C57.106-1977), the reconditioning step when contacting the oil with filter media and/or when performing the mechanical separation of oil and water by centrifuging must be accomplished at low temperature to avoid a high level of dissolved water in the oil, since the saturation amount increases rapidly with temperature. The Guide further describes that in reclaiming, the oil is usually treated by contact with Fuller's earth, an adsorbent clay material which is effective in removing the oxidation products and acids. It also states that irrespective of the type of clay treating process used for the reclaiming, the oil should be put through some device for removing free water before it contacts the clay in order to prevent water (free) from wetting the clay. Water (free) is said to cause at least partial and possibly complete blocking of the clay, thus rendering it ineffective to remove the acids and oxidation products which are detrimental to the oil.

The above Guide also describes vacuum dehydrators (degasifiers) as an efficient means of reducing water and gas in the oil to a very low value. There is considerable other literature which describes this vacuum dehydrator step. Typical references to this step are U.S. Pat. No. 3,675,395 (July 11, 1972) by Baranowski and U.S. Pat. No. 3,339,346, (Sept. 5, 1967) by Buchanan, both of which describe an apparatus for heating, filtering-/coalescing and vacuum degasifying of transformer oil, and an article by Robert Schenck in January 1983 Transmission and Distribution magazine describing apparatus for heating, filtering and vacuum degasifying of transformer oils. This latter reference discusses use of a cold trap operating at $-85°$ F. to obtain adequate vacuum to sufficiently reduce the water content to meet specifications. This cold trap is refrigerated with a cascade refrigeration unit to attain the very low temperature. Another reference is Pennwalt Corporation Bulletin 950 (981-SM-1P) and Data Sheet 910D (583-5M-1P), further describing the type of units discussed in the Schenck article. The references reveal that the transformer oil to be degasified, should be at a temperature of 40°–45° F. above existing oil temperature or in one case (U.S. Pat. No. 3,339,346) a minimum of 122° F. The industry range in practice seems to be about 120°–160° F.

Thus, from the standpoint of dealing with the water in transformer oils, the mechanical separation techniques want low temperatures and the degasifying step wants significantly higher temperatures. Both conditions are consistent with the mass transfer principals involved in the reconditioning process. However, in the reclaiming process, i.e., the removal of certain chemical compounds from the contaminated oil, the mass transfer principles involved dictate that such high viscosity liquids as transformer oils should be heated to a temperature that reduces the viscosity to permit a practical rate of mass transfer of the compounds from the oil to the adsorbent (Fuller's earth). This feature is mentioned in the Pennwalt Bulletin 950.

The tests for measuring the properties of transformer oil that affect its performance as an insulator and coolant are mostly those established under the American Society for Testing Materials (ASTM). These are numerous, but those particularly relevant are the measures of insulating quality which are Dielectric Breakdown Strength (indirect measure) and Water Content (direct measure); and the measures of contaminating chemical compounds formed from the deterioration of the oil, Acid Number and Interfacial Tension. The Acid Number is a direct measure of corrosive compounds in the oil and the Interfacial Tension is an indirect measure of sludge formation which adversely affects insulating and coolant properties.

From experience, specifications have been developed that state the values of the results of these ASTM test methods which insure the user of a satisfactory oil. These values have been specified for new and used or "in service" oil. The ASTM (Spec. D-3487) gives a set of values for new oil. The IEEE, as cited earlier, reports values for new and used oil for service at several voltage levels. Manufacturers of transformer equipment may specify the ASTM limit values (D-3487) as satisfactory for low and medium voltage transformers. The manufacturers usually have more stringent limits for high voltage transformers.

SUMMARY OF THE INVENTION

The present invention relates to a method of reconditioning and reclaiming transformer insulating oil. The contaminated transformer oil, at ambient temperatures, is first preheated in indirect heat exchange with a quantity of partially processed treated oil and is then heated to a temperature in the range of 100° to 125° F. The heated contaminated oil is then passed through an adsorber containing, for example, a quantity of Fuller's earth having a particle size of 30 to 60 mesh. The hot oil leaving the adsorber is then passed through a heat exchanger where, as indicated above, it is placed in indirect heat exchange with the source of contaminated feed oil. The indirect heat exchanger will raise the temperature of the feed oil to about 70° F. whereas the hot oil from the adsorber will be cooled to a temperature of about 80° F.

Treated oil from the heat exchanger passes through a chiller where its temperature is reduced to about 50° to 70° F. After passing through the chiller, the treated oil passes through a centrifuge which separates the free water from the oil by centrifugal force. The water from the centrifuge is discarded and the treated oil from the centrifuge passes through a second heater where its temperature is raised to about 120° to 160° F.

The reheated oil passes to a degasifier wherein it is subjected to an absolute pressure of about 0.2 to 2 mm of mercury. Water and dissolved gasses are removed by the vacuum pump. Treated oil from the bottom of the degasifier leaves at about a temperature of 120° F. and passes through a polishing filter exiting at about 120° F.

The treated oil from the polishing filter will have a water content of about 10 ppm, a dielectric breakdown voltage of about 39 KV, an Acid Number of about 0.01 mg KOH/gm and an Interfacial Tension of about 44 dynes/cm. In one of the examples, the contaminated oil contains 37 ppm of water, a breakdown voltage of 25 KV, and Acid Number of 0.175 mg KOH/gm and an Interfacial Tension of 19.0 dynes/cm, all of these are properties exceeding or being at the minimal acceptable requirements for transformer oil. In some of the other examples, the water content is even higher and the dielectric breakdown voltage is even lower.

DETAILED DESCRIPTION OF THE PREFERRED EMBODIMENTS

Figure 1:
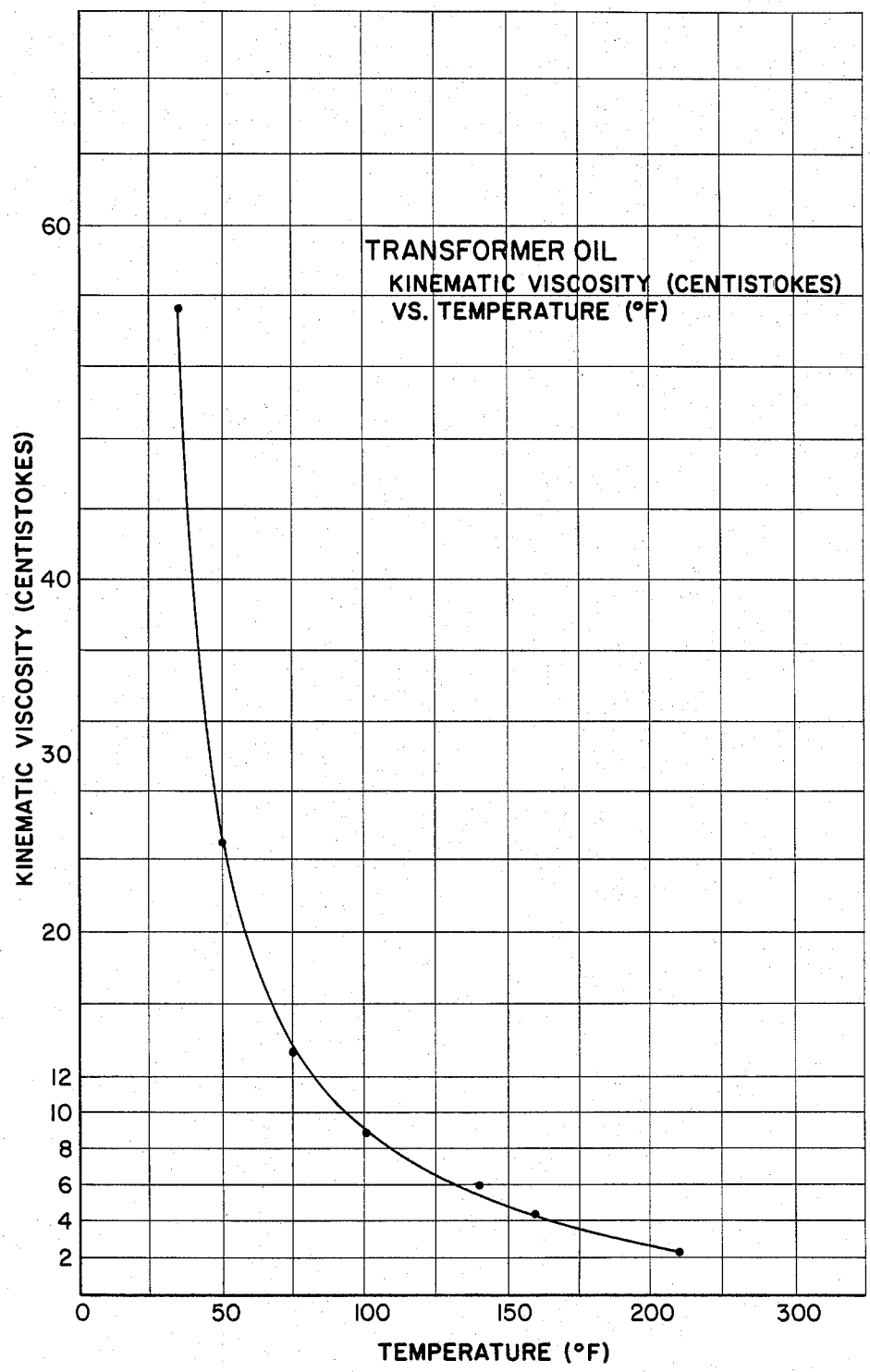
FIG. 1 is a graphical plot of transformer oil viscosity versus temperature.
Figure 2:
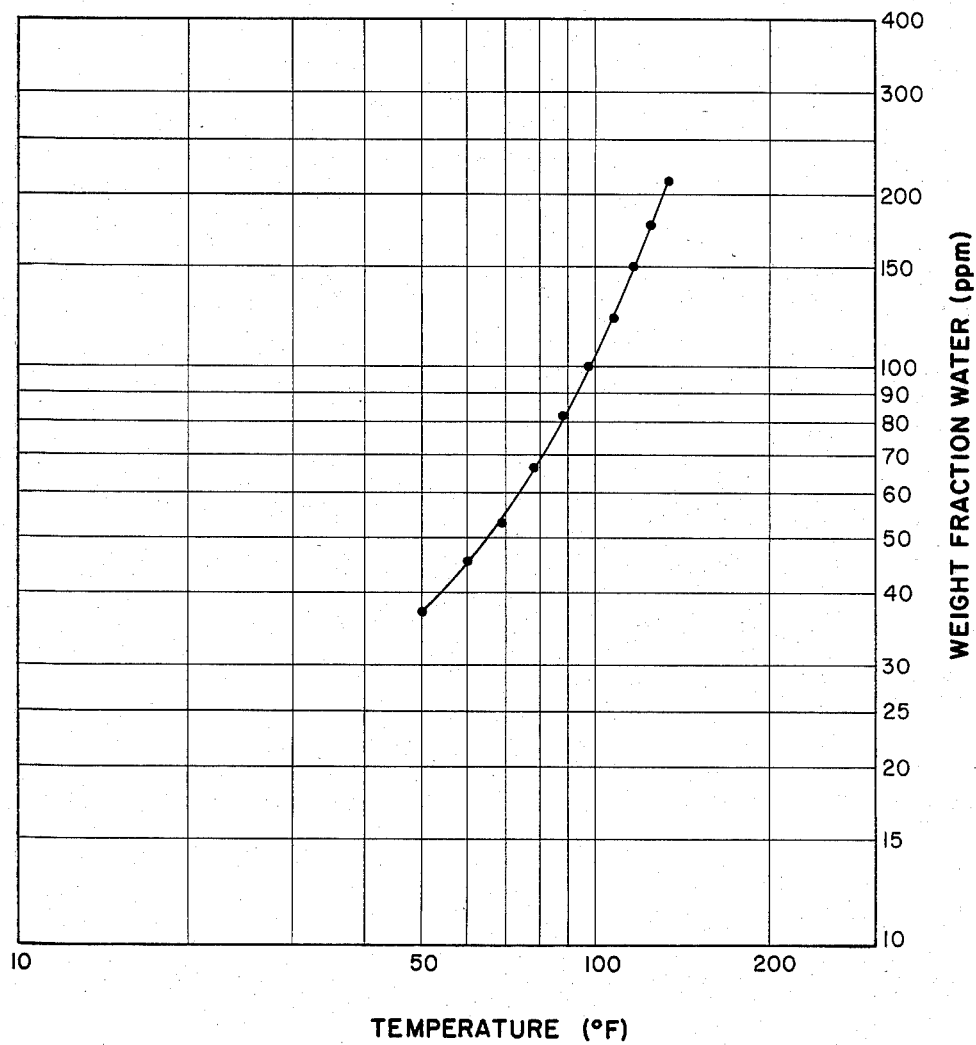
FIG. 2 is a graphical plot, on logarithmic scales, of the water content in parts per million in water-saturated 10-C transformer oil versus temperature.

The present invention provides an effective and efficient means of combining both the reclaiming and the reconditioning process into one continuous treatment of transformer oil. FIG. 1 is a plot of transformer oil viscosity vs temperature. This shows the large reduction in viscosity obtained by heating the oil to 100° F.-125° F. Beyond that range little further reduction in viscosity is gained. Since the mass transfer rate is inversely proportional to viscosity, this reduction increases the mass transfer rate by the same amount. As pointed out earlier, the solubility of water in oil increases very sharply with temperature (see FIG. 2). It was found in experimental work that raising the oil temperature 50° F. i.e., to 100° F. for 50° F. oil in storage prior to contacting the adsorbent reduced the viscosity to give optimum mass transfer rates and insured the absence of free water when the oil contacted the clay. In the process of the present invention, the contaminated oil is not treated to remove free water (if any) prior to heating and prior to contact with the adsorbent, even though the prior art dictates otherwise.

However, another phenomenon was found to occur when using Fuller's earth for successful reclaiming at these higher temperatures. Test work has shown that due to the inherent moisture content of the Fuller's earth (around 3% as manufactured) the hot oil, not being saturated after the temperature is raised, will strip water from the Fuller's earth and exit from the adsorbent bed largely saturated at the higher temperature. A material balance shows that the time required to strip 1% of moisture from the adsorbent was about 8.5 hours under the conditions of the test. Since the adsorbent must be replaced in a short time (16 hours or less) to be effective in removing the acidic and oxidized materials, the reclaimed oil will always contain a large excess of water over that desired for ultimate use, whether the source oil did or not. This therefore demands that an effective reconditioning (water removal) be done following the hot oil reclaiming step. Other methods cope with this by using large and expensive vacuum degasifying equipment. Equipment for removal of this water under vacuum must handle large volumes of water vapor. Recognizing the need for a continuous process to reclaim and recondition transformer oil, certain test work was done. Used transformer oil, the properties of which are shown in Table 1, was passed through a first stage heater and over a bed of Fuller's earth of 30/60 mesh particle size. The oil temperature from the source was about 50° F. and the temperature control out of the heater was set in the range of 160° F. to 180° F. Initially the absorbent bed was at ambient temperature (about 50° F.) and it was gradually heated up by the hot oil. The resulting water content in the exit oil, as its temperature increased, is shown in Table 2. These data clearly show the stripping effect of the hot oil passing over the adsorbent as the temperature increases. The successful reclaiming of the oil is shown by the data in Table 3. These data show that the adsorbent is effectively removing the acidic and oxidized compounds, as indicated by the Acid Number and Interfacial Tension values remaining well within the specifications. The tendency of the adsorbency to decrease with time is offset by the higher mass transfer rate with increasing temperature.

This reclaimed oil was further tested by cooling to 60°-70° F. and centrifuging. The results of various samples are shown in Table 4. These data show that the free water was consistently separated by centrifuging leaving only the dissolved amount in the oil. Further tests were run using transformer oil feed with water content of 35-50 ppm (the level after centrifuging) by putting this through a vacuum degasifier. Table 5 shows the degasifier conditions and the results obtained. These data show that the oil was successfully reconditioned with the water contents well within specification.

Figure 3:
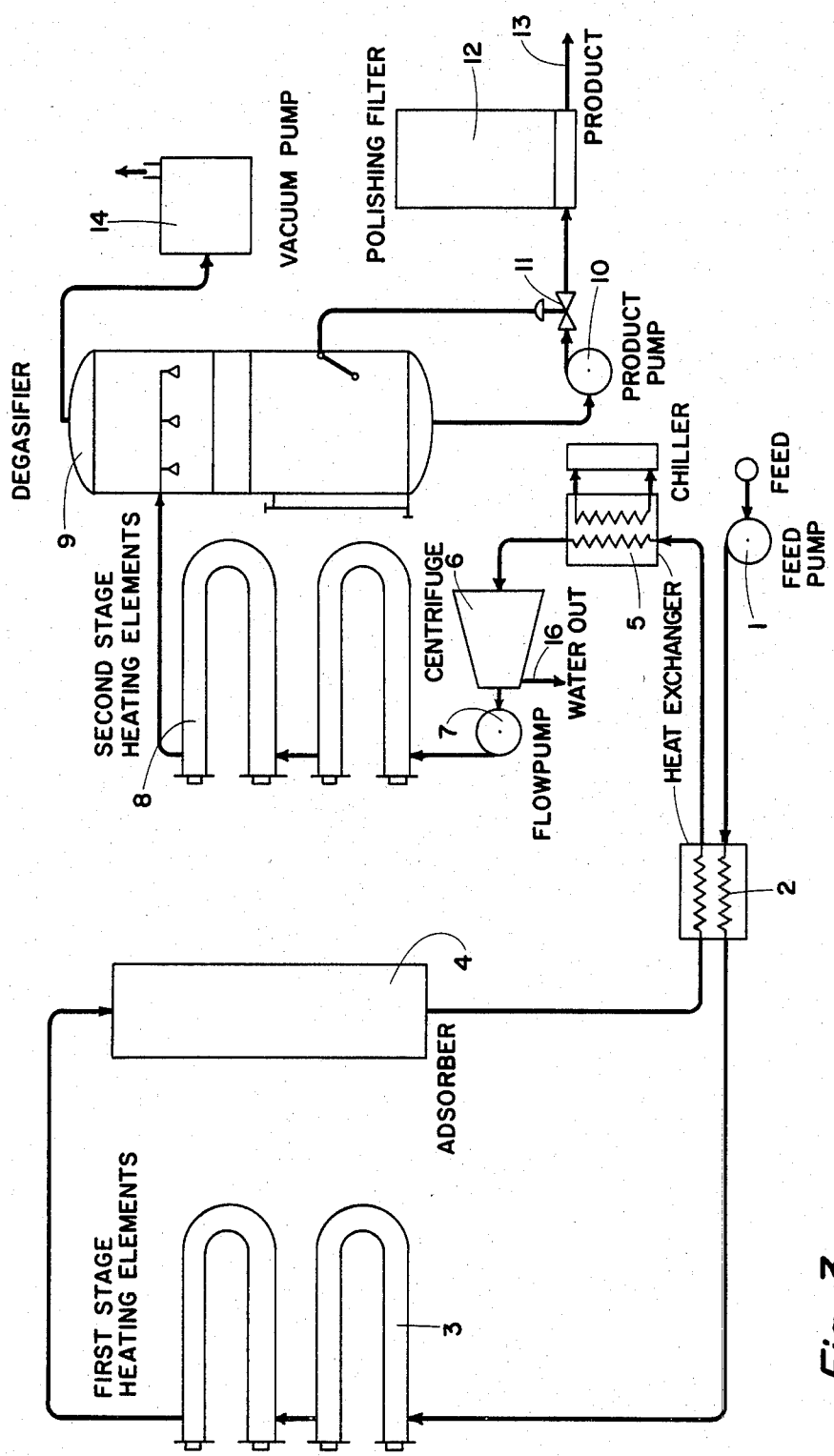
FIG. 3 is a flow diagram illustrating the process of the present invention.

Based on these data, a method has been devised to effectively perform both reclaiming and reconditioning of transformer oil in this order in an efficient and continuous manner. FIG. 3 shows this method. In the flow diagram shown in this figure, the contaminated oil is taken from the feed source by feed pump 1 and pumped through heat recovery exchanger 2 where the feed oil temperature is raised by the hotter oil coming from the adsorber 4 to a temperature in the range of 70°-100° F. This preheated oil flows through the first stage heating elements 3 where the feed oil is further heated to a temperature in the range of 100°-125° F. The hot oil then flows to an adsorber vessel 4 filled with granular Fuller's earth of size range 30 to 60 mesh. As the hot oil contacts the Fuller's earth, the acidic and oxidized materials in the oil adhere to the microporous surface of the adsorbent. Since the oil is substantially hotter than it was at its source, there is no free water present to block the pores of the adsorbent and limit the removal of these contaminants. The reclaimed oil then flows from the adsorber 4 to the heat recovery exchanger 2 to transfer some of its heat to the incoming feed oil (as indicated above). The temperature of the reclaimed oil is further reduced to the range of 50°-70° F. by flowing through a chiller 5. The chiller is a refrigeration unit producing 50° F. water for chilling the oil stream by heat exchange. The oil at 60° F. now has free water in it since the solubility has been reduced from 115 ppm at 100° F. to 46 ppm at 60° F. (see FIG. 2). The chilled oil flows to a centrifuge 6 which separates the free water and oil by centrifugal force. The water is drained to waste through outlet 16 and the oil is pumped by flow pump 7 through the second stage heating elements 8 where the temperature is raised to the range of 100°-160° F. This temperature is suitable for removal of the dissolved water and gas in the degasifier 9. This vessel is suitably designed to disperse the oil and spread it over high surface area so that as much liquid surface as possible is exposed to the high vacuum in the vessel. The vacuum is maintained on the vessel by vacuum pump 14. The degasifier pressure is thereby maintained at 0.2 to 2 mm mercury absolute. The degasifier has a suitable level control 11 to hold a level in the bottom and allow product pump 10 to pump the net flow through the polishing filter 12. This polishing filter contains filter elements that will retain all but the very smallest (say less than 0.5 micron) particles that may be present. The reconditioned and reclaimed oil ("Product") is recovered from the polishing filter by way of the exit pipe 13 and may be returned to the original source. Pilot plant tests were carried out utilizing the method described above. A transformer oil having the properties shown in Table 1 was processed at an average flow rate of 7-8 gpm for about 5 hours continuing for about one hour additional time at an average flow rate of about 15 gpm and at equilibrium temperature and pressure conditions. Results of the test at equilibrium are described below in Example I.

EXAMPLE I

With reference to FIG. 3, the feed oil (referred to above) is pumped by the feed pump 1 at a temperature of 50° F. through the exchanger 2 where its temperature is raised to an equilibrium temperature of 70° F. The preheated feed oil passes through the heater 3 where its temperature is raised to an equilibrium temperature of slightly above 100° F. The heated feed oil passes through the adsorber 4 and leaves at an equilibrium temperature of 100° F. At this point, the water content of the oil leaving the adsorber 4 is approximately 105 ppm. The hot oil from the adsorber 4 passes through the heat exchanger 2 where it is cooled by the incoming feed oil to a temperature of 80° F. Treated oil from the heat exchanger 2 passes through the chiller 5 where its temperature is reduced to 60° F. The chilled oil flows through a centrifuge 6 which separates the free water and oil by centrifugal force. The treated oil from the centrifuge 6 passes through a second heater 8 where its temperature is raised to 120° F. The reheated oil passes to the degasifier wherein it is subjected to an absolute pressure of 2 mm mercury provided by vacuum pump 14. Water vapor and dissolved gases are removed by the vacuum pump 14. Treated oil leaves the bottom of the degasifier at a temperature of 120° F. and passes through the polishing filter 12 exiting at a temperature of about 120° F. The oil 13 exiting the polishing filter has a water content of 10 ppm, a dielectric breakdown voltage of 39 KV, an Acid No. of 0.01 mg KOH/gm and an Interfacial Tension of 44 dynes/cm.

EXAMPLE II

With reference to FIG. 3, the feed oil having the properties of Source No. 2 in Table 6 is pumped by the feed pump 1 at a temperature of 80° F. through the exchanger 2 where its temperature is raised to an equilibrium temperature of 100° F. The preheated feed oil passes through the heater 3 where its temperature is raised to an equilibrium temperature of slightly above 120° F. The heated feed oil passes through the adsorber 4 and leaves at an equilibrium temperature of 120° F. At this point, the water content of the oil leaving the adsorber 4 is approximately 175 ppm. The hot oil from the adsorber 4 passes through the heat exchanger 2 where it is cooled by the incoming feed oil to a temperature of 100° F. Treated oil from the heat exchanger 2 passes through the chiller 5 where its temperature is reduced to 64° F. The chilled oil flows through a centrifuge 6 which separates the free water and oil by centrifugal force. The treated oil from the centrifuge 6 passes through a second heater 8 where its temperature is raised to 125° F. The reheated oil passes to the degasifier 9 wherein it is subjected to an absolute pressure of 2 mm mercury. Water vapor and dissolved gases are removed by the vacuum pump. Treated oil leaves the bottom of the degasifier at a temperature of 125° F. and passes through the polishing filter 12 exiting at a temperature of about 125° F. The oil exiting the polishing filter has a water content of 10 ppm, a dielectric breakdown voltage of 39 KV, an Acid No. of 0.01 mg KOH/gm and an Interfacial Tension of 40.4 dynes/cm.

EXAMPLE III

With reference to FIG. 3, the feed oil having the properties of Source No. 3 in Table 6 is pumped by the feed pump 1 at a temperature of 80° F. through the exchanger 2 where its temperature is raised to an equilibrium temperature of 100° F. The preheated feed oil passes through the heater 3 where its temperature is raised to an equilibrium temperature of slightly above 120° F. The heated feed oil passes through the adsorber 4 and leaves at an equilibrium temperature of 120° F. At this point, the water content of the oil leaving the adsorber 4 is approximately 175 ppm. The hot oil from the adsorber 4 passes through the heat exchanger 2 where it is cooled by the incoming feed oil to a temperature of 100° F. Treated oil from the heat exchanger 2 passes through the chiller 5 where its temperature is reduced to 60° F. The chilled oil flows through a centrifuge 6 which separates the free water and oil by centrifugal force. The treated oil from the centrifuge 6 passes through a second heater 8 where its temperature is raised to 125° F. The reheated oil passes to the degasifier 9 wherein it is subjected to an absolute pressure of 2 mm mercury. Water vapor and dissolved gases are removed by the vacuum pump. Treated oil leaves the bottom of the degasifier at a temperature of 125° F. and passes through the polishing filter 12 exiting at a temperature of about 125° F. The oil exiting the polishing filter has a water content of 10 ppm, a dielectric breakdown voltage of 43 KV, an Acid No. of 0.02 mg KOH/gm and an Interfacial Tension of 44.6 dynes/cm.

Whereas the above examples show that Fuller's earth is the preferred adsorbent, it should be understood that other art-recognized adsorbents could also be used. Fuller's earth was selected as the preferred adsorbent in the present process principally because it was the least expensive adsorbent available. Other adsorbents include activated alumina, bauxite, Bentonite, diatomaceous earth, silica gel, activated carbon, bone char and possibly other suitable adsorbents.

The particle size of 30 to 60 mesh has been selected because this appears to optimize the surface area per weight of adsorbent in light of the flow conditions through the adsorbent bed. Particle sizes in the range of 60 to 90 mesh could be employed but the resistance to flow through the adsorbent bed may be somewhat higher than desirable. Particle sizes smaller than 90 mesh are not recommended because of the high resistance to flow. Particle sizes larger than 30 mesh can be employed but it may be necessary to increase the size of the adsorbent bed due to the loss of surface area per unit weight of adsorbent.

Although the heating of the contaminated transformer oil in the first stage heating elements 3 has been described in terms of a preferred heating range of 100° to 125° F., it should be understood that higher temperatures could be employed if desired; thus, a broader temperature range of 100° to 160° F. should be considered as falling within the ambit of the present invention.

CONCLUSION

This method of the present invention has several advantages the principal ones of which are as follows:
1. Does not require water separation ahead of reclaiming.
2. Provides optimum conditions for the reclaiming process.
3. Minimizes the size and cost of the vacuum degasifying equipment for reconditioning.
4. Provides optimum conditions for the reconditioning process.
5. Provides a continuous process for simultaneously reclaiming and reconditioning contaminated transformer oil.

Whereas the present invention has been described in particular relation to the drawings attached hereto, it should be understood that other and further modifications, apart from those shown or suggested herein, may be made within the spirit and scope of this invention.

TABLE 1

Feed Oil Properties
(Contaminated Transformer Oil)

| | |
|---|---|
| Water, ppm | 37.0 |
| Dielectric Breakdown Voltage, KV | 25.0 |
| Acid Number, mg KOH/gm | 0.175 |
| Interfacial Tension, Dynes/cm | 19.0 |

TABLE 2

Adsorber Outlet Oil
Water Content vs Temperature
(Using Feed Oil of Table 1)

| Water Content, ppm | Temperature, °F. |
|---|---|
| 65 | 80 |
| 105 | 110 |
| 130 | 120 |

TABLE 3

Adsorber Outlet Oil
Properties vs Temperature
(Using Feed Oil of Table 1)

| Acid Number, mg KOH/gm | Interfacial Tension, Dynes/cm | Adsorbent Operating Temperature, °F. |
|---|---|---|
| 0.02 | 40 | 110 |
| 0.01 | 44 | 120 |
| Specification: 0.03 max. | 40 min. | |

TABLE 4

Centrifuge Tests
Water Content, ppm
(Using Feed Oil of Table 1)

| From Adsorber | After Centrifuge |
|---|---|
| 102 | 39 |
| 137 | 41 |
| 124 | 40 |
| 124 | 36 |

TABLE 5

Degasifier Test
(Using Feed Oil of Table 1)
Degasifier Conditions: 120–130° F.
2 mm Hg Absolute Pressure

| Oil Properties: | Test Oil | Specification ASTM (new oil), D-3487[1] |
|---|---|---|
| Dielectric Breakdown Voltage, KV | 39 | 30 min.[2] |
| Water Content, ppm | 10 | 35 max.[2] |
| Acid Number, mg KOH/gm | 0.01 | 0.03 max. |
| Interfacial Tension, dynes/cm | 44 | 40 min. |

[1]Usually applied to low and medium voltage transformers.
[2]For high voltage transformers these values are 35 KV min. and 15 ppm max. as given by IEEE. The other values (Acid number and Interfacial Tension) are the same for high voltage service.

TABLE 6

Feed Oil Properties
(Contaminated Transformer Oil)

| | Source No. 2 | Source No. 3 |
|---|---|---|
| Water, ppm | 110 | 100 |
| Dielectric Breakdown Voltage, KV | 17 | 20 |
| Acid Number, mg KOH/gm | 0.14 | 0.08 |
| Interfacial Tension, dynes/cm | 17.6 | 25.6 |

What is claimed is:

1. A process for treating contaminated transformer oil which comprises the steps of heating the contaminated transformer oil in a first heater to a temperature in the range of 100° to 160° F.; passing the heated contaminated oil from the first heater through an adsorber containing an adsorbent capable of removing acidic compounds, other products of oxidation and colloidal contaminants from the contaminated oil; conducting the treated oil from the adsorber to a chiller where the temperature is reduced to about 50° to 70° F.; conducting the treated oil from the chiller to a centrifuge to remove free water; conducting the treated oil from the centrifuge to a second heater where the oil is heated to a temperature of about 100° to 160° F.; conducting the treated oil from the second heater to a degasifier wherein the oil is subjected to a high degree of vacuum; removing the treated oil from the degasifier and passing it through a polishing filter.

2. A process for treating contaminated transformer oil as set forth in claim 1 wherein the adsorbent is Fuller's earth.

3. A process for treating contaminated transformer oil as set forth in claim 2 wherein the Fuller's earth is of about 30 to 60 mesh particle size.

4. A process for treating contaminated transformer oil as set forth in claim 1 wherein the contaminated transformer oil is initially preheated before conducting the same to the first heater by placing the the contaminated transformer oil in indirect heat exchange with the treated oil leaving the adsorber.

5. A process for treating contaminated transformer oil as set forth in claim 4 wherein the contaminated oil is taken directly from storage to the initial preheating step without the treatment of the contaminated oil to remove any free water.

6. A process for treating contaminated transformer oil as set forth in claim 1 wherein the vacuum is about 0.2 to 2 mm of mercury.

7. A process for treating contaminated transformer oil as set forth in claim 1 wherein the contaminated transformer oil is heated in the first heater to a temperature in the range of 100° to 125° F.

8. A process for treating contaminated transformer oil as set forth in claim 1 wherein the temperature of the treated oil from the adsorber is reduced to about 60° to 70° F. in the chiller.

9. A process for treating contaminated transformer oil as set forth in claim 1 wherein the treated oil from the centrifuge is heated to a temperature of about 120° F. in the second heater.

* * * * *